United States Patent [19]

McElwain

[11] Patent Number: 4,702,227
[45] Date of Patent: Oct. 27, 1987

[54] SOLAR ENERGY COLLECTOR AND SYSTEM

[76] Inventor: John A. McElwain, Calle Fray Luis DeLeon, 4-Entl.°, Palma De Mallorca, Spain

[21] Appl. No.: 810,824

[22] Filed: Dec. 17, 1985

Related U.S. Application Data

[63] Continuation of Ser. No. 255,899, Apr. 20, 1981, abandoned, which is a continuation of Ser. No. 927,048, Jul. 24, 1978, abandoned.

[51] Int. Cl.[4] .............................................. F24J 2/26
[52] U.S. Cl. .................................... 126/417; 126/449
[58] Field of Search .................. 98/31; 126/450, 449, 126/448, 400, 417, 432, 429, 428

[56] References Cited

U.S. PATENT DOCUMENTS

| | | | |
|---|---|---|---|
| 664,706 | 12/1900 | Anderson | 98/31 |
| 2,601,905 | 7/1952 | Anderegg | 98/31 |
| 4,029,081 | 6/1977 | Strong | 126/449 |
| 4,222,373 | 9/1980 | Davis | 126/450 |

Primary Examiner—Henry A. Bennet

[57] ABSTRACT

A solar collector whose absorber plate is made of a conventional building material, e.g., tile, stucco, concrete or the like, and forms the outer surface, e.g., wall or roof, of the building. The fluid to be heated, typically air, flows behind the absorber rather than between an absorbing plate and a cover of glass or other transparent material, and heat is transferred to the fluid by metal conductors which extend from adjacent the outside surface of the absorber to, and define at least part of the flow passage. The system includes a cold tank of liquid in which heat is stored at a relatively low temperature, a heat tank of liquid at a relatively higher temperature; and a heat pump for transferring heat from the cold tank to the heat tank. There is a cold exchanger in the cold tank for receiving heated fluid from the collector and transferring heat therefrom to the liquid in the cold tank, and a heat exchanger in the heat tank for the transferring heat from the liquid in the heat tank to the air used to heat the building interior.

20 Claims, 6 Drawing Figures

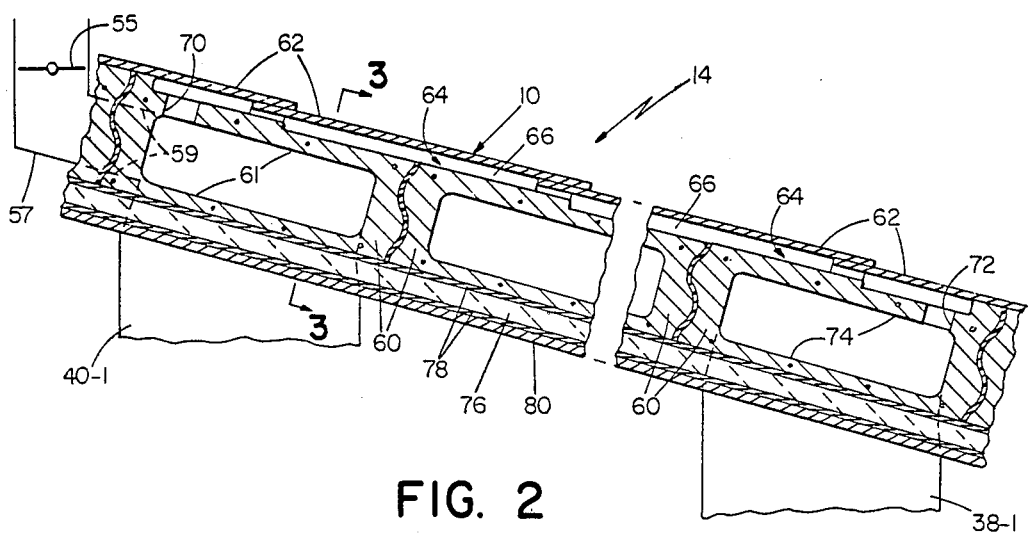
FIG. 2
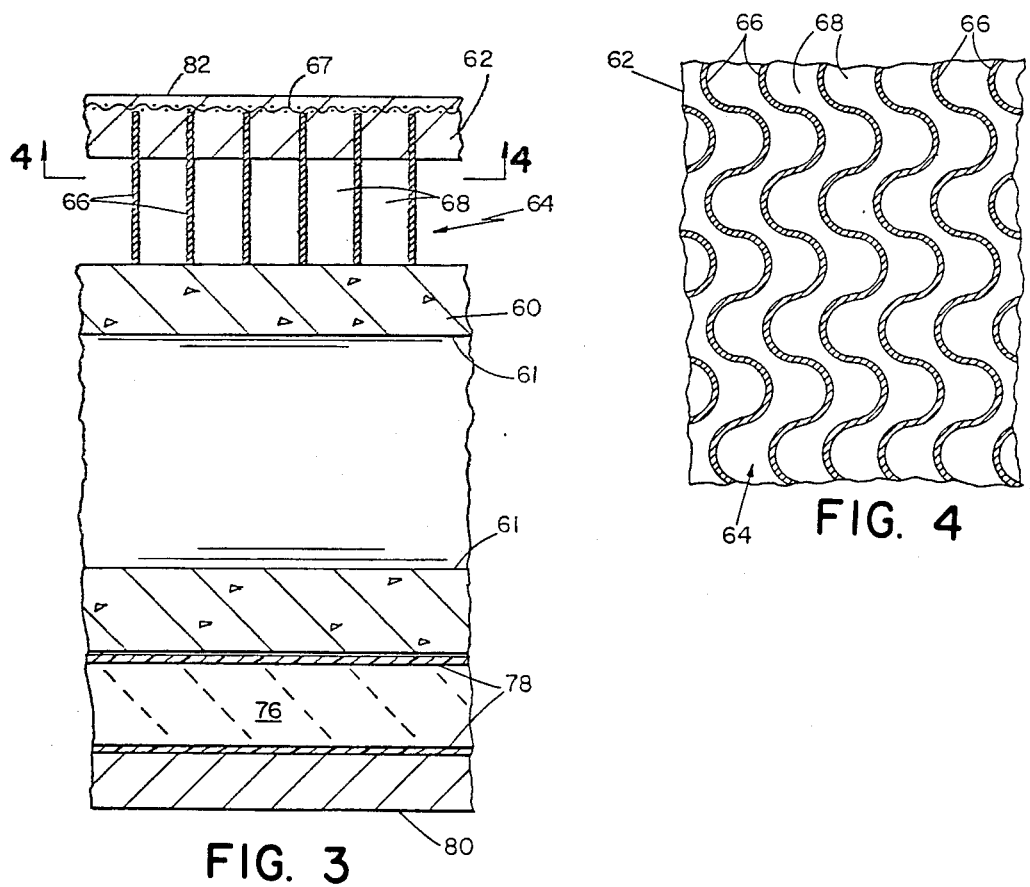
FIG. 3                  FIG. 4

SOLAR ENERGY COLLECTOR AND SYSTEM

This is a continuation of application Ser. No. 255,899 filed Apr. 20, 1981 now abandoned, which itself is a continuation of Ser. No. 927,048 filed July 24, 1978 now abandoned.

This invention relates to solar heating and, more particularly, to a solar energy system providing heat, humidity control, air conditioning and hot water.

There are many solar heating systems available, substantially all of which have one or more disadvantages. The principal disadvantages of traditional solar systems include the high cost and architectural unattractiveness of the solar collectors, the high temperatures to which the collectors must heat the fluid passed through them, the high cost of separate supply and distribution systems and of providing a secondary heating system, inadequate controls, and the use of multiple components of similar functions.

The present invention seeks to overcome these disadvantages. One of its principal objects is to provide a solar collector that is compatible with, and will not change the appearance of, conventional buildings; and that at the same time is less expensive than solar collectors now generally available. Other principal objects of the invention are to provide a solar system which achieves greater efficiency through collection and storage of heat at relatively low temperature and by making multiple use of its different components, and which provides humidity control during both the heating and air conditioning seasons.

In one aspect, the present invention features a solar collector whose absorber plate is made of a conventional building material, e.g., tile, stucco, concrete or the like, and forms the outer surface, e.g., wall or roof, of the building. The fluid to be heated, typically air, flows behind the absorber rather than between an absorbing plate and a cover of glass or other transparent material, and heat is transferred to the fluid by metal conductors which extend from adjacent the outside surface of the absorber to, and define at least part of the flow passage.

A second aspect of the invention is directed to a system including a cold tank of liquid in which heat is stored at a relatively low temperature, a heat tank of liquid at a relatively higher temperature; and a heat pump for transferring heat from the cold tank to the heat tank. In such a system, the present invention includes a cold exchanger in the cold tank for receiving heated fluid from the collector and transferring heat therefrom to the liquid in the cold tank, and a heat exchanger in the heat tank for the transferring heat from the liquid in the heat tank to the air used to heat the building interior.

Principal features of other aspects include systems in which air from the collectors can flow through a heat exchanger in a tank of liquid in either a closed loop or, as desired, in an open path commencing and terminating in the atmosphere, systems in which air for heating the building is passed first through a cold exchanger in a tank of relatively low temperature liquid to dehumidify the air and thence through a heat exchanger in a tank of relatively high temperature liquid to raise the air to the temperature required for building heating; and those including separate cold, heat and domestic hot water tanks, one heat pump for transferring heat from the cold tank to the heat tank, and a second heat pump sharing a compressor and condenser/evaporator with the first heat pump to transfer heat from the heat tank to the domestic hot water tank.

The preferred embodiments of the invention, of course, include features of several of these aspects. In such embodiments conductive metal fins engage a metal mesh embedded in the absorber plate parallel to and about 1 mm. from the exterior surface thereof, and project rearwardly into the air passage behind the absorber plate and divide it into a plurality of generally parallel flow passages each about 1 cm. wide and 2 cm. high. Additionally, the liquid in the cold tank is at a variable temperature of generally not more than about 25° C. during the heating season and 11° C. during the air conditioning season, and the heat tank liquids at the relatively higher temperature of 30° C. to 45° C. The domestic hot water tank is at a temperature of 50° C. to 60° C., and there are ducts providing for air flow through the heat or cold exchanger from either the collector or the heated building, and also ducts from the collector to the heat exchanger in the hot water tank.

Other objects, features and advantages will appear from the following detailed description of a preferred system, taken together with the attached drawings in which:

FIG. 2 is a sectional view of a portion of the roof of the building of FIG. 1;

FIGS. 3 and 4 are sectional views taken at, respectively, 3—3 of FIG. 2 and 4—4 of FIG. 3;

Figure 1:
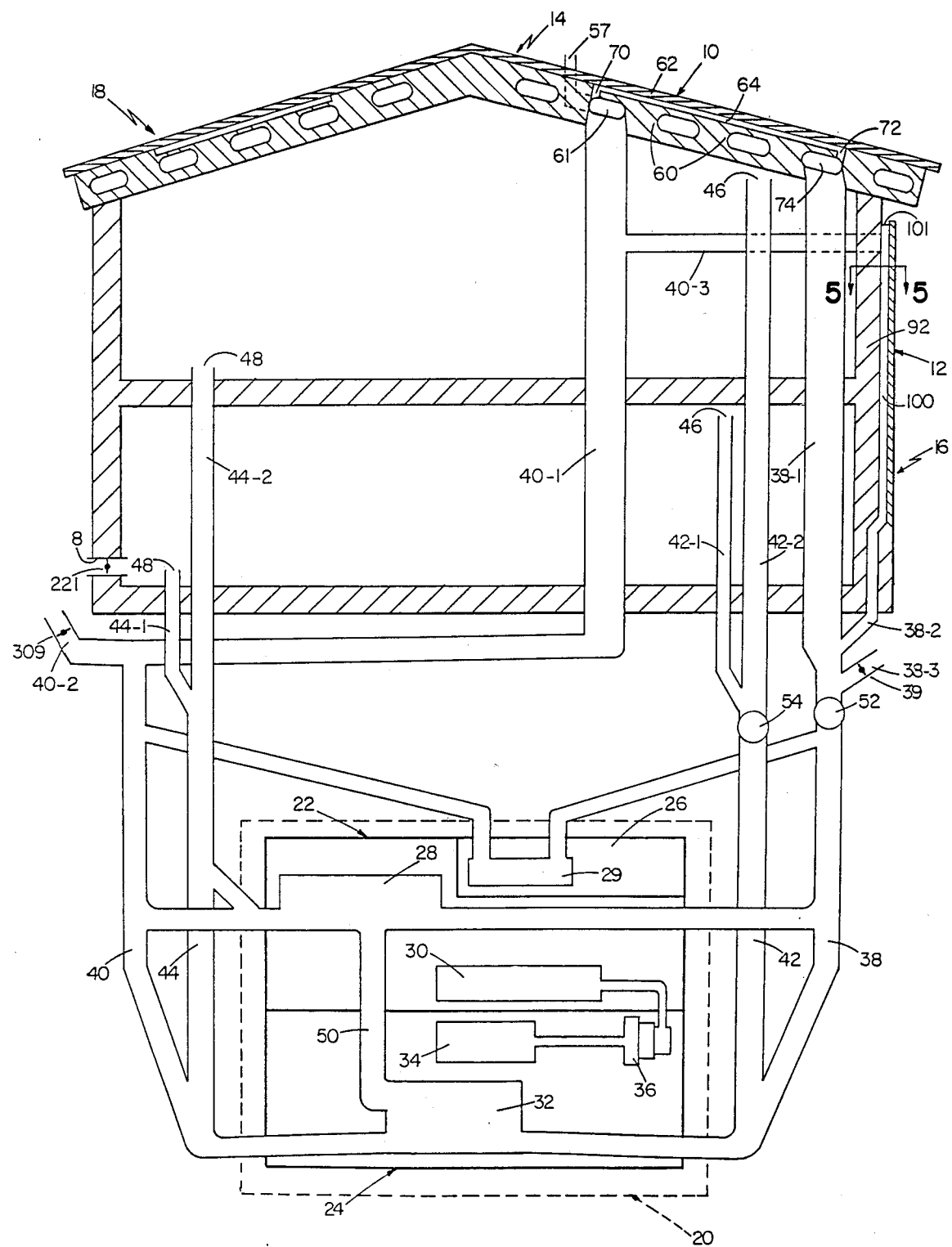
FIG. 1 is a schematic view, somewhat simplified, of a building having a solar system embodying the present invention.

Referring now to FIG. 1, solar collectors 10, 12 in the south facing roof 14 and wall 16 of a building 18 are connected by ductwork to a central heating system, generally designated 20. The central system includes a concrete heat tank 22, a concrete cold tank 24 and a domestic hot water tank 26, each filled with water. An air-water heat exchanger 28 and condenser/evaporator 30 are mounted within heat tank 22; an air-water cold exchanger 32, evaporator 34, and compressor 36 in cold tank 24; and an air-water heat exchanger 29 in hot water tank 26.

As shown, heat exchangers 28 and 29 and cold exchanger 32 are connected in parallel between the pair of air ducts 38, 40 leading to and from collectors 10, 12; and heat exchanger 28 and cold exchanger 32 are connected also in parallel between air ducts 42, 44 leading to outlets 46, 48, at, respectively, the ceiling and floor of rooms in building 18. A by-pass air duct 50 permits flow directly between heat exchanger 28 and cold exchanger 32. Reversible, variable-speed blowers 52, 54 are mounted in, respectively, the duct 38 from collectors 10, 12 and the duct 42 from ceiling outlets 46. Stale air is exhausted from the building through wall port 8, flow through which is controlled by damper 221.

Referring also to FIGS. 2-4 roof 14 is made of hollow concrete beams 60, extending the width of the roof and supporting collector 10, which comprises conventional roof tiles 62 spaced from the upper surface of beams 60 to provide an air passage 64 between the tiles and beams. Aluminum fins 66 are embedded in tiles 62 with their outer ends generally parallel to and close to the outer surface 82 of the tiles and projecting from the back of the tiles across air passage 64 to beams 60. Fins 66 are about 1 mm. thick and both help to support tiles 62 and divide air passage 64 into a number of small (typically 0.05 cm. to 2.0 cm. wide and 1 cm. to 3 cm. high) flow passages 68. Fins 66 are typically straight; but (as shown in FIG. 4) they may also be generally sinusoidal, of amplitude about equal to the width of a flow passage 68, so that air through the flow passages will follow a serpentine rather than a straight path. To improve heat transfer from tile outer surface 82 (on which sunlight is incident) to the flow passages, heat conductors are embedded in the tiles parallel to and closely adjacent the tile outer surface and in engagement with the adjacent ends of fins 66. In the illustrated embodiment, the conductors comprise aluminum mesh 67. In other embodiments, the fins themselves may be "L" or "T" shaped in cross-section, with the leg of the "L" or cross-bar of the "T" forming the conductor parallel to the tile outer surfaces.

Duct 40-1 provides for air flow from system 20 to the duct 61 provided by the beam 60 at one end of collector 10, and port 59 permits outside air to flow from fresh air duct 57, which extends to outside building 18 and is controlled by damper 55, into beam duct 61. Air from either duct 40-1 or port 59 flows from beam duct 61 through port 70 extending the width of collector air passage 64 and longitudinally of beam 60, into the collector. A similar port/duct arrangement is provided by the beam 60 at the far end of collector. There, air from collector passage 64 flows through beam port 72 into beam duct 74 and thence into duct 38-1 and to system 20.

Insulation 76 between a pair of vapor barrier sheets 78 insulates collector 10 and beams 60 from the plaster ceiling 80 of the rooms in building 18 below.

Figure 5:
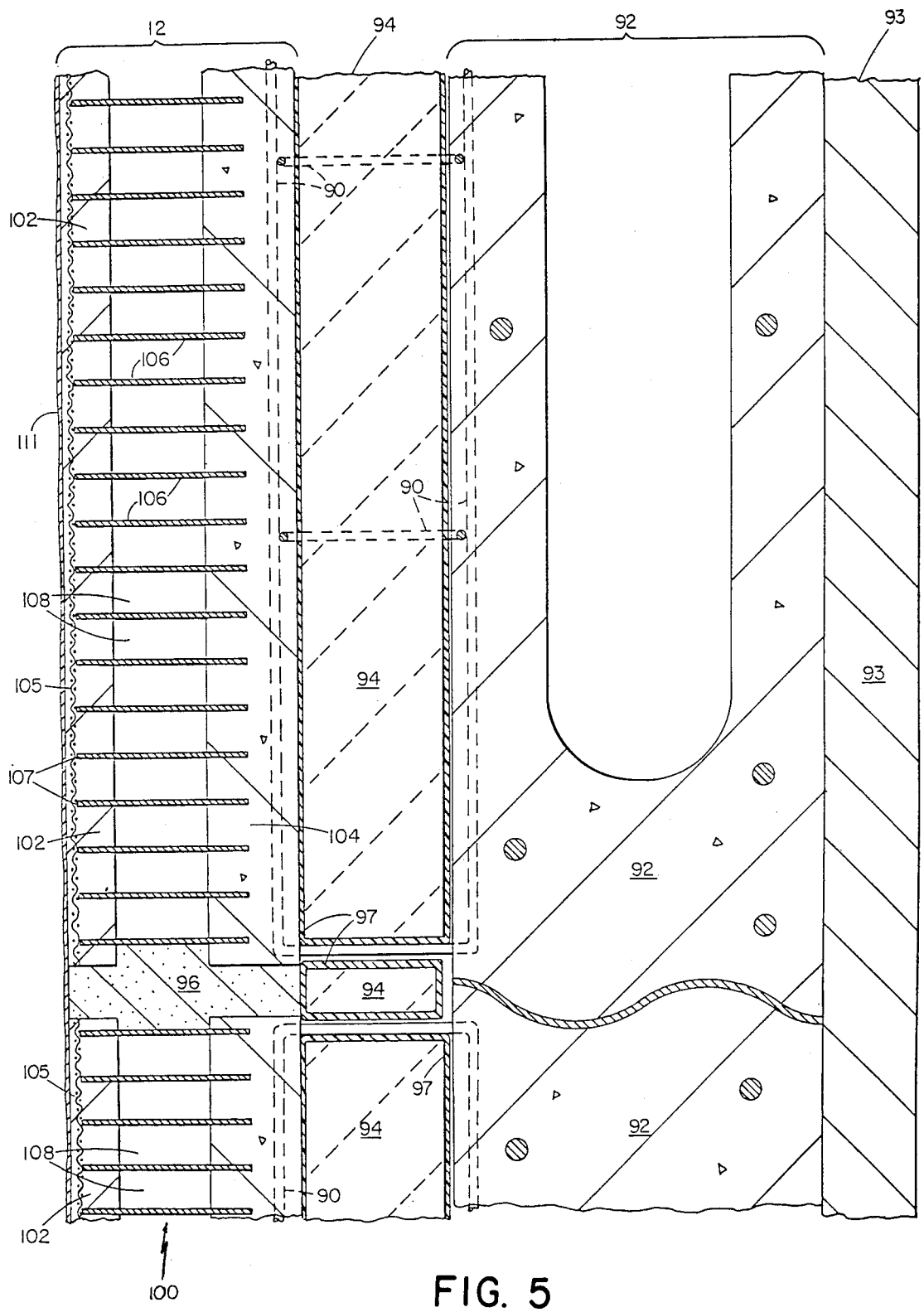
FIG. 5 is a sectional view, taken at 5—5 of FIG. 1, of a portion of the wall of the building of FIG. 1.

Wall collector 12, shown most clearly in FIG. 5, is prefabricated unit attached by wire ties 90 to the extruded reinforced concrete beams 92 forming the inner wall of building 18, and includes a vertical air passage 100 between a prefabricated slab 102 forming the exterior wall of the building and an interior concrete slab 104. The inside of beams 92 is covered with plaster 93. As shown, air passage 100 is open to the outside at its top, and is connected at its bottom to duct 38-2. Air flow into passage 100 from the outside is controlled by damper 101. Air may also flow into the top of collector passage 100 through duct 40-3. Aluminum screen mesh 105 is embedded in slab 102, parallel to and about 1 mm. from the exterior surface of the slab, and rectangular in cross-section aluminum fins 106 are embedded in between walls 102, 104 and divide passage 100 into a number of smaller flow passages 108. For good heat conditions, the outside edges 107 of fins 106 are in engagement with mesh 105. The space between beams 92 and collector 12 is filled with insulation 94 having vapor barrier sheets 97 at its inner and outer surfaces. Similarly concrete 96 and insulation 94 fill the space between adjacent collector units.

Because the entire system is designed to operate at relatively low collection and storage temperatures, the exterior surface of collectors 10, 12 need not be black, as with conventional absorber plates, but may be a color that is architecturally compatible and conventional. Roof tiles 62 will typically be the same red or other relatively dark color as conventional tiles; stucco slab 102 may even be pink in a relatively sunny climate, and darker in other regions. In extreme conditions, a selective (high absorbtivity/low emissivity) surface coating such as shown at 111 in FIG. 5 may be used, but it generally is not required. Similarly, it generally is not necessary to provide a transparent heat intensifying cover over the exterior surface of the collector. Cost is reduced, and problems of weathering, breakage, overheating and the like are substantially eliminated. A color is used to insure the collector has the desired absorbtivity and may be mixed throughout the tile, stucco, concrete, etc. forming the collector exterior.

Figure 6:
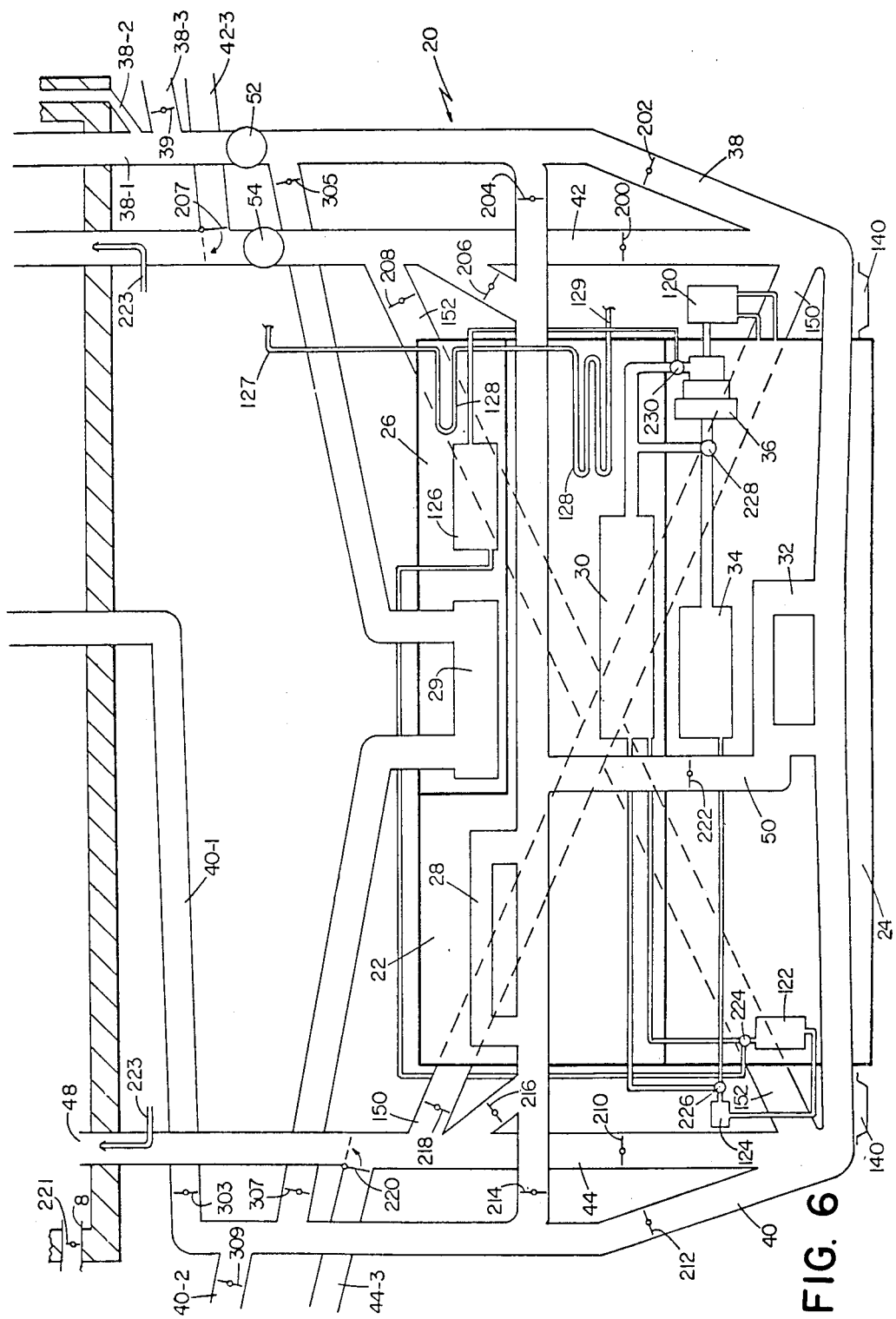
FIG. 6 is a schematic view of the central heating system of FIG. 1.

Reference is now made to FIG. 6, which illustrates central heating system 20 in greater detail. Heat tank 22, cold tank 24 and hot water tank 26 are closely adjacent each other. The size of each depends on, inter alia, the type and size of building 18. For a small semi-detached house having a heat loss of about 40,000,000 calories per day, heat tank 22 and cold tank 24 each typically is eight cubic meters in size, thus providing five to six days heat storage. A motor 120, mounted outside but having cooling lines attached to cold tank 24, drives compressor 36. An accumulator 122 and expansion valve 124 are mounted, respectively, within and outside cold tank 24 and are connected to each other. The inlet of accumulator 122 is connected, through control valve 224, to condenser/evaporator 30 in heat tank 22 and to a second condenser 126 in hot water tank 26; and the outlet of expansion valve 124 is connected, through control valve 226, to both evaporator 34 in cold tank 24 and condenser/evaporator 30 in heat tank 22. The inlet of compressor 36 is connected, through control valve 228 to evaporator 34 and evaporator/compressor 30; the compressor outlet through control valve 230 to evaporator 126 and condensor/evaporator 30.

There are, thus, two heat pumps or refrigeration systems, and both are driven by compressor 36 and controlled by expansion valve 124 and accumulator 122. One of the systems couples cold tank 24 and heat tank 22, includes evaporator 34 and condenser/evaporator 30 (acting as a condenser) and is operable to pump heat from cold tank 24 (at a relatively low temperature) to heat tank 22 (at a relatively higher temperature). The other system couples heat tank 22 and hot water tank 26, includes condenser/evaporator 30 (acting as an evaporator) and condenser 126, and pumps heat from heat tank 22 to hot water tank 26 (which is at the relatively highest temperature). Each of tanks 22, 24, 26 is full of water. The water in heat, cold and hot water tanks 22, 24, 26 acts as a substantially constant temperature heat sink. Domestic water is heated continuously as it flows through heating coils 128 in heat tank 22 and hot water tank 26.

For efficiency of operation, cold exchanger 32 and heat exchanger 29 are mounted at the bottoms of, respectively, cold tank 24 and hot water tank 26; and heat exchanger 28, 29 is mounted near the top of heat tank 22. Similarly, cold tank evaporator 34 is at the top of the cold tank, above cold exchanger 32; and heat tank condenser/evaporator 30 is at the bottom of heat tank 22, below heat exchanger 28.

Spray humidifiers 223 are provided in ducts 42 and 44 to humidify as necessary. The particular humidifier used depends on the direction of air flow, the spray being directed to saturate the air as it flows in the ducts from the building interior.

In operation, the above-described system provides many different services, including heating, humidity control (humidification and dehumidification), air conditioning (cooling), fresh air flow, heat collection and dispersal, heat transfer between the various tanks, and heating of domestic hot water. Generally, its operation is as follows:

1. Heating

During the winter heating season, the temperature of the water in the cold tank 34 is typically maintained between 10° C. and 25° C. and, lacking a brine solution in the cold tank and defroster in the cold exchanger, never less than about 3° C. To maintain this temperature, air passed through the cold exchanger must be at a somewhat higher temperature, e.g., 15° C. to 30° C. and not less than about 5° C. The maximum temperature of the cold tank depends on whether dehumidification is desired, in which event temperatures above about 11° C. are undesirable, and will never exceed the stagnation temperature of collectors 10, 12, typically ranging from 20°–70° C. in the winter, and 30°–85° C. in the summer, according to incident energy.

The water in the cold tank is heated in the winter by air from collectors 10, 12. Air is drawn through collector air passages 64, 100 by blower 52 and is heated by solar energy conducted by fins 66, 106 through the outer shell of the collectors into contact with the flowing air. If the temperature of the outside air is greater than that of water in cold tank 24, outside air is drawn into collectors 10, 12 through duct 57 and the open top of passage 100, and after cooling in cold exchanger 32 is discharged to the atmosphere through duct 40-2. When the outside air is colder than the cold tank, dampers 55, 301 and 309 are closed, damper 303 is opened and air is drawn from and recirculated through ducts 40-1, and 40-3, 38-1 and 38-2. In either event, the extent to which the air is heated depends, inter alia, on the length of the flow passages in the collectors and the amount of radiant energy. On a sunny day, a 10° C. temperature rise will be achieved in a collector three meters long; on a cloudy day, the temperature rise will be closer to 3°–4° C. The heated air passes through cold exchanger 32 in cold tank 24, in which the air is cooled and the heat extracted therefrom warms the water in the cold tank.

On many days, the temperature of air heated in collector 10, 12 will be higher than the temperature of the water in heat tank 22, and the temperature of the water in cold tank 24 may be at the maximum allowable for cooling or dehumification. On such days, it is desirable to store as much heat as possible in system 20 to prepare for colder days ahead. In these circumstances, heat may be added directly to heat tank 22, rather than transferring it to the heat tank from cold tank 24, by passing air from collectors 10, 12 through heat exchanger 28.

For heating, the temperature of the water in heat tank 22 must be above that of the interior of building 18, but if too high will unnecessarily increase the work that must be done by compressor 36. Typically, the water is maintained at about 30°–35° C. (about 85°–95° F.), a temperature sufficient to heat air through heat exchanger 28 to room heating temperature. When the temperature of water in heat tank 22 drops below this temperature, heat is transferred to the heat tank from cold tank 24. Motor 120 drives compressor 36, taking refrigerant vapor from evaporator 34, compressing it, and passing the compressed vapor to condenser 30 where it liquifies and deposits its latent heat in heat tank 22. The heat deposited raises the temperature of the liquid in the heat tank, and is stored in the heat tank until needed. The liquid refrigerant returns, via accumulator 122, to evaporator 34 where it evaporates and, in vaporizing, absorbs heat from and cools cold tank 24. The refrigerant is then again compressed and the cycle repeated as necessary.

The interior of building 18 itself is heated by air circulated through the heat exchanger 28 in heat tank 22. Blower 54 draws air through ceiling inlets 46 into ducts 42-1 and 42-2 and then forces it through the heat exchanger, where it is heated, and into ducts 44 from which the heated air is discharged into the building rooms through floor outlets 48. If it is desired to dehumidify the building heating air, some or all of the air flow from ceiling ducts 46, rather than being passed directly into heat exchanger 28, is directed first through cold exchanger 32 and then into the heat exchanger through by-pass duct 50. Some of the water vapor in the humid air condenses in the cold exchanger, and the condensed vapor collects and is eventually removed from a drip pan 140 at one end of the cold tank. As shown, the ducts leading from cold exchanger 32 to the opposite ends of the cold tank slope slightly downwardly so that condensate will flow to drip pans 140.

Fresh air from the outside can be introduced into system 20 and be heated in heat exchanger 28, either with or without dehumidification, through duct 38-3. Ducts 44-3 and 42-3 bring fresh air to the system 20 without passing it through the collectors 10 or 12. Stale air may be expelled directly to the outside by damper(s) 221.

2. Cooling (Air Conditioning)

During the summer cooling (air conditioning) season, the temperature of cold tank 24 is maintained between 10° C. and 15° C. (50°–59° F.), preferably about 11° C. (52° F.); so that the relative humidity of 20° C. (68° F.) air to building 18 will not exceed about 55 percent. To prevent the temperature of water in the tank from becoming too high, excess heat in the cold tank must be dissipated, either through heat tank 22 or, when possible, directly. Normally, heat is removed from the cold tank and deposited in heat tank 22 by activiating compressor 36, just as during the heating season. When the temperature of the water in the heat tank becomes higher than that of the outside air, it is cooled by circulating air from the outside through heat exchanger 28. Blower 52 draws the cooling air so circulated from the outside of the building through duct 38-3 and, after forcing the air through the heat exchanger, where it absorbs heat from the water in heat tank 2, discharges the heated air to the atmosphere through duct 40-2. Some of the heat in heat tank 22 may also be dissipated by transferring it to hot water tank 26 and using it to heat domestic hot water. At night, heat in cold or heat tank may be dissipated more directly by passing cold outside air from duct 57 through the collector and then through the cold or heat exchanger.

To cool building 18, blower 54 is reversed and the direction of air flow, through the cold exchanger 32, is the reverse of that used during heating. Blower 54 draws air from floor level inlets 48 (outlets during heating) into ducts 44 and forces it through exchanger 32 where it is cooled and may be dehumidified. From there, the cool air is returned to the rooms of building 18 through ceiling outlets 46 (inlets during heating).

It is possible to cool (air condition) while simulultaneously collecting heat in the cold tank. To thus collect more heat than otherwise possible, blower 54 draws air from floor ducts 48 and forces it, through cross-duct 150, to the end of duct 42 and then through cold exchanger 32. After being there cooled and transferring heat to the water in the cold tank, the air is returned to the ceiling ducts 46 of building 18 via a second crossover duct 152. At the same time, air from collectors 10, 12 is forced through cold exchanger 32 by blower 52.

3. Hot Water Heating

During the summer the water in hot water tank 26 normally will be heated by the air from collectors 10, 12 using a closed circuit air flow pattern through ducts 2-107, 40, and 40-1 to the collector 10 and then 38 and 2-105 to the heat exchanger 29 in the hot water tank 26. Although the collector may only operate at 20% to 30% efficiency, its large area based upon winter conditions will more than compensate for efficiency losses.

Hot water tank 26 also may be heated using the heat pump, during both the winter heating and summer cooling seasons. When the temperature of water in hot water tank 26 drops below about 55° C. (131° F.), motor 120 is activated and heat is transferred to the hot water tank 26 from heat tank 22. Compressor 36 draws refrigerant vapor (typically Freon) from condenser/evaporator 30 in heat tank 22 (which now operates as an evaporator), compresses the vapor, and then passes it to condenser 126 in hot water tank 26 where it liquifies and deposits latent heat. The liquid refrigerant returns to condenser/evaporator through accumulator 122.

Regardless of the manner in which the water in tank 26 is heated, the domestic hot water for household use is drawn off through outlet pipe 127, having been heated by passing it through coils 128 in heat tank 22 and hot water tank 26. Heating is continuous, cold water being taken in through inlet pipe 129.

4. Controls

Controls for the system are of four basic types, dampers 39, 55, 101, 200 through 222 and 303-309 for controlling air flow through the ductwork and the cold and heat exchangers, valves 224 through 230 which together with expansion valve 124 control transfer of heat from cold tank 24 to heat tank 22 and from heat tank 22 to hot water tank 26, switches for controlling air blowers 52, 54 and compressor motor 120, and sensors (not shown) for monitoring the temperatures of air and water at various points within the system. The controls permit the system to perform any of the following services:

1. Heating the interior of building 18
2. Cooling the interior of building 18
3. Humidification of air to the interior of building 18
4. Dehumidification of air to the interior of building 18
5. Supply of fresh air to the interior of building 18
6. Collection of heat in cold tank 24
7. Collection of heat in heat tank 22
8. Collection of heat in hot water tank 26
9. Dispersion heat from cold tank 24
10. Transfer of heat from cold tank 24 to heat tank 22
11. Transfer of heat from hot tank 22 to hot water tank 26
12. Heating of domestic hot water in coil 128.

Most of these services may be performed in any one of several ways, as desired to improve overall efficiency; and many may be performed simultaneously. For example, the services numbered 1-5 above, and their combinations, take precedence over those following, but virtually always can be combined with the others. The services numbered 6, 7, and 9 are not combined with each other, but may be combined with distribution services and/or heat pump operation. Hot water tank collection is compatible with dispersion of heat from the heat tank and cold tank.

For efficiency, the heat pumps are only used when the proper temperature ranges in the cold, heat or hot water tanks cannot be maintained by other means.

As already mentioned, dampers 57 and 101 control the flow of air into collectors 10, 12 from the atmosphere and permit air to be discharged to the atmosphere without passing through the collectors. Dampers 200-206, 208-218 and 222, shown fully closed, control other air flow in the system. Damper 207 permits flow between duct 42, the central system, and a selected one or more of duct 44-1 and air outlet 48, damper 210 similarly permits them between duct 44, the central system, and duct 42-1 and air inlet 46. As will be evident, various ones of the dampers will be opened (either entirely or in part, as desired) to permit air driven by one of the blowers 52, 54 to flow along the then-desired path. For cooling, for example, blower 54 is actuated to draw air down into duct 44, and dampers 200 and 210 are opened to permit the air to flow through cold exchanger 32 and then back into building 18 through duct 42. If fresh make-up air is desired, then damper 220 is opened also and air from the outside (through duct 44-3) is drawn in by blower 54, cooled and passed to the building interior, where stale air damper 221 is opened.

Valves 224-230 permit refrigerant to flow in either the heat transfer loop including evaporator 34 and condenser/evaporator 30, for transferring heat from cold tank 24 to heat tank 22; or in the loop including condenser/evaporator 30 and condenser 126, for transferring heat from heat tank 22 to hot water tank 26. In either case vapor from the evaporator unit is drawn into compressor 36 and compressed; and liquid exiting from the condenser unit passes into accumulator 122 and then through expansion valve 124 to the evaporator unit.

For winter operation with dehumidification, a typical neutral range for the cold tank would be 11 to 14 degrees centigrade. Below that range heat collection occurs; above the range, the heat pump goes on to transfer heat from the cold tank. Similarly, a typical neutral range for the heat tank might be 35 to 45 degrees centigrade. Below that range the heat pump goes on and/or heat will be collected from the collectors. Collection will occur whenever the cold tank is warm enough (above 11° C.) and the heat tank is below 44°. When the heat tank is above 44° the collector will be used for the hot water tank, and above 45° dispersal of heat from the heat tank will occur. If the heat tank is between 44° and 45° and the cold tank is above 13° (due to cooling requirements during the winter), then heat in the cold tank will be dispersed. Dispersal will only occur when the outside air temperature is several degrees below the tank temperature, and usually at night.

If dehumidification is not required, the winter cold tank temperature may be allowed to rise to 25° to 30° C. Under such conditions the work of compression will be greatly reduced.

For summer operation, the neutral range for the cold tank, typically, might be 3° to 11° C., and for the heat tank 27° to 30°. Cooling the building, will warm the cold tank, and whenever necessary the heat pump will transfer excess heat to the heat tank. Dispersal of heat from the heat tank will occur whenever the water in the tank is above 30° and the outside air temperature is appropriate. Heat will be collected in the hot water tank whenever the heat tank is above 29° C. and the collector is warm enough. During hot spells, the heat pump will be required for transferring but from the cold tank to the heat tank, but it will not be necessary to use it for hot water.

Generally speaking during winter operation heat will not be dispersed from the heat tank or collected in the hot water tank because either the cold tank or the heat tank will be too cool. Cold tank collection is given precedence over heat tank collection because the collectors are most efficient when operating at the lower temperature. There will be little collection of heat in the heat or cold tanks in the summer because the tank temperatures will be too high.

During the seasons of changeable weather, heat may be collected on one day and dispersed on another, depending of course on the temperatures of the water in the heat and cold tanks.

In general the temperature of liquid in the cold tank is governed by heat added from the collector or by cooling air from within the building, and heat taken from the tank by the heat pump or through dispersal to the outside. The heat tank temperature is controlled by heat added by the collector or the heat pump, and by heat is taken out by dispersal, or for heating the building, or for the hot water tank. Heat is added to the hot water tank by collection or the heat pump, and taken away by cooler water coming through the coils. Ultimately the climate and service requirements determine the temperatures of the tanks and whether the system is in a heat collection or heat dispersal mode, and the use of these modes is optimized to maximize overall efficiency.

Efficiency is also maximized by varying the flow path of air used to accomplish a desired service or services. In the winter, when heat is being collected and the building heated, the choice of air paths depends, inter alia, on the relative temperatures of the outside air, air at the collector exits, and the cold exchanger. When the air in building 18 is warmer than any of these, the most simple heating airflow pattern is used—dampers 206 and 216 are opened, and distribution blower 54 draws air into duct 42 from the building and circulates the air in a closed loop extending thorugh heat exchanger 28 and then back into the building interior. If, however, the temperature of air at the collector exits is warmer than that of the air inside building 18, then air from the collector (rather than from the building interior) will be used to heat the building because it will take less heat from the heat exchanger and will thus reduce the amount of heat that must be transferred (by the heat pump) from the cold tank to the heat tank. In this situation, the dampers are opened as required to cause air to flow from the collectors, through heat exchanger 28 in heat tank 22 to duct 44 and thence into building 18, and then from the building through duct 42, through cold exchanger 32 where heat from the inside air is deposited in the cold exchanger, and then into duct 40 and back to the collectors.

If the outside air is also warmer than that inside, then still another flow pattern is used. Outside air is drawn into the collectors, passed in order through the heat exchanger, building and cold exchanger, and then discharged to the atmosphere. If the temperature of the air in the building should happen to be cooler than the cold exchanger, then air is discharged directly to the atmosphere from the building, rather than being passed through the cold exchanger. In both these latter two patterns, advantage is taken of the fact that when the temperature of the outside air is higher than that of the air within the building, less heat will be taken from the heating system if outside air is used.

As a final example of the ways in which the flow pattern may be changed, and without making any attempt here to describe other useful flow patterns that will be evident from a careful examination of the system, the temperature of the cold exchanger may be permitted to rise to where it is frequently higher than that of the inside air in those climates or during those seasons in which cooling and dehumidification are not important. If, in these circumstances, the temperatures of the outside air and of air at the collector exit are also both cooler than the inside air, air drawn from the building interior may be prewarmed by passing it through the cold exchanger and then directing it through crossover duct 50 to the heat exchanger and then back to the building interior.

Other Embodiments

In addition to tile or stucco, the conductive metal fins of collectors 10, 12 may be embedded in a number of other cementitious clay-containing materials such as concrete, brick, and terra cotta. In some embodiments, the fins may be embedded in and extend to the the outer surface of a slab, and a thin (not over about 2 mm. thick) skin (such as that designated 111 in FIG. 5) of some other conventional or composition building material (such as foam glass, marble, plastic, slate, asbestos shingles, and aluminum or vinyl siding) may overlie the slab and define the outer surface of the collector and building. In all such embodiments, the outer surface of the collector will be sturdy and will not significantly alter the exterior appearance of the building. To insure the desired overall thermal conductivity, it is generally desirable to include metal particles in any cementitious material or to provide a mesh, such as mesh 105, within 2 mm. of the outer surface of the collector and in engagement with the outer edge of the fins.

It should also be evident that heat tank 22 and cold tank 24 may be filled with liquids other than water; that different types of heat pumps may be used to transfer heat from the cold tank to the hot tank and from the hot tank to the hot water tank; and that cold exchanger 32 and heat exchanger 28 may be any of a wide range of conventional liquid-gas heat exchangers. In any event, however, it is preferable that the cold exchanger 32 and evaporator 34 in cold tank 24 be physically separated from each other, and that heat exchanger 28 and condenser/evaporator 30 be spaced apart also, to insure that flow through one of the two can be varied without affecting the other.

The large, relatively constant temperature heat sink provided by water in heat tank 22 and cold tank 24 insure predictable heat transfer in cold exchanger 32 and heat exchanger 26, and make it possible also to select a compressor based on steady state rather than peak operating conditions.

Other embodiments will be within the scope of the following claims

What is claimed is:

1. A solar collector designed to form a portion of the roof or exterior wall of a building, said collector comprising:
   an opaque absorber of cementitious clay-containing material defining the exterior surface of said collector, said absorber arranged to form a portion of said roof or exterior wall and to absorb solar energy incident thereupon, said exterior surface being essentially visually a continuation of and indistinguishable from adjacent other portions of said roof or exterior wall;
a longitudainlly-extending fluid flow passage directly behind said absorber, said passage having a fluid inlet and a fluid outlet and providing for fluid flow therein from said inlet to said outlet; and
a plurality of longitudinally-extending transversely spaced metal heat conductors embedded in said absorber, each of said conductors extending rearwardly from within said absorber closely adjacent and behind said exterior surface into said passage and, within said passage, extends generally parallel to a line extending from said inlet to said outlet along the path of fluid flow in said passage,
said collector being free from any transparent cover overlying said absorber whereby solar energy impinges directly on said exterior surface, is conducted by said heat conductors into said passage, and is transferred from said conductors to fluid flowing through said passage.

2. The collector of claim 1 wherein said material is chosen from the group consisting of tile, stucco, concrete, terra cotta and brick.

3. The collector of claim 1 wherein said conductors comprise a plurality of metal fins generally rectangular in transverse cross-section.

4. The collector of claim 1 wherein said conductors include first portions embedded in said absorber not more than about 2 mm. from and generally parallel to said exterior surface, and second portions generally perpendicular to the exterior surface of said absorber and projecting from said first portions into said passage.

5. The collector of claim 1 including conductive material in said absorber generally parallel to and not more than about 2 mm. from the exterior surface thereof, and exterior said conductors engage said material.

6. The collector of claim 1 wherein said fluid is air, said flow passage has a height in the range of 1 to 3 cm. and adjacent ones of said metal heat conductors are spaced 0.05 to 2.0 cm. apart.

7. The collector of claim 1 including a mesh of heat conductive material embedded in said absorber generally parallel to and a short distance from the exterior surface of said collector, and wherein said metal conductors comprise a plurality of fins of generally rectangular cross-section embedded in said absorber with the portions thereof most nearly adjacent said exterior surface engaging said mesh.

8. The collector of claim 7 wherein said fins project rearwardly from said absorber across said flow passage.

9. The collector of claim 8 wherein said fluid is air and adjacent ones of said fins are spaced 0.05 to 2.0 cm. apart.

10. The collector of claim 7 wherein the outer portions of said fins and said mesh are not more than about 2 mm. from said exterior surface.

11. The collector of claim 7 including a layer of opaque material other than said cementitious material overlying said mesh and defining the exterior surface of said absorber.

12. The collector of claim 11 wherein said opaque material is selected from the group consisting of slate, marble asbestos, plastic, foamed glass, and coated metal siding.

13. The collector of any claim 1 wherein said collector includes an outer member comprising said absorber and an inner member generally parallel to and spaced from said outer member, a layer of heat conducting material is positioned generally parallel to and not more than about 2 mm. from said exterior surface, and said conductors comprise a plurality of generally parallel fins engaging said layer and extending between said members.

14. The collector of claim 13 wherein said fluid is air and fins are metal and are embedded in both of said members and are spaced 0.05 to 2 cm. apart.

15. The collector of claim 12, wherein said inlet is spaced not less than about 3 meters from said outlet and wherein each of said inlet and outlet extend transversely of said collector a major portion of the total width of said flow passage.

16. The collector of claim 1 wherein said material defines said exterior surface, and including a coloring agent of predetermined color and relative amount dispersed throughout the portion of said material defining said surface and the area adjacent thereto, whereby the portion of said absorber defining said surface will have and continue to have the necessary absorbtivity notwithstanding wear thereof.

17. A solar energy collector designed to form a portion of the roof or exterior wall of a building, said collector comprising:
an opaque absorber of cementitious clay-containing material defining the exterior surface of said collector and arranged to absorb solar energy incident thereupon;
a metal heat conductor embedded within said absorber generally parallel to and closely adjacent said exterior surface;
a longitudinally-extending fluid flow passage directly behind said absorber, said passage having a fluid inlet and a fluid outlet and providing for fluid flow therein from said inlet to said outlet; and,
a plurality of longitudinally-extending metal heat conductors each of which engages said first-mentioned heat conductor and extends rearwardly therefrom and projects into said passage and, within said passage, extends generally parallel to a line extending from said inlet to said outlet along the path of fluid flow in said passage,
said collector being free from any transparent cover overlying said absorber whereby solar heat energy impinges directly on said exterior surface of said absorber, is conducted by said first-mentioned conductor and said longitudinally-extending conductors to said passage, and is transferred from said longitudinally-extending conductors to fluid flowing through said passage.

18. The collector of claim 17 wherein said first-mentioned heat conductor is not more than about 2 mm. from said exterior surface.

19. The collector of claim 1 wherein the respective distance from said exterior surface to each of said heat conductors is not more than about 2 mm.

20. A solar energy collector designed to form a portion of the roof or exterior wall of a building, said collector comprising:
an opaque absorber defining the exterior surface of said collector, arranged to absorb solar energy incident thereupon, and including therein a metal heat conductor generally parallel to and not more than about 2 mm from said exterior surface;
a longitudinally-extending air passage directly behind said absorber, said passage having an air inlet and an air outlet and providing for air flow therein from said inlet to said outlet; and, a plurality of longitudinally-extending metal heat conductors engaging said first-mentioned heat conductor and extending rearwardly therefrom, said longitudinally-extending conductors projecting into said passage and extending generally parallel to a line extending from said inlet to said outlet along the path of air flow in said passage, said collector being free from any transparent cover overlying said absorber whereby solar heat energy impinges directly on said exterior surface of said absorber, is conducted by said first-mentioned conductor and said longitudinally-extending conductors to said passage, and is transferred from said longitudinally-extending conductors to air flowing through said passage.

* * * * *